US008121364B2

(12) United States Patent
Mahesh et al.

(10) Patent No.: US 8,121,364 B2
(45) Date of Patent: Feb. 21, 2012

(54) SYSTEM AND METHODS FOR COMPUTER AIDED ANALYSIS OF IMAGES

(75) Inventors: Prakash Mahesh, Hoffman Estates, IL (US); Shuo Li, London (CA); Dave Roeder, Toronto (CA); Ian Ross, London (CA)

(73) Assignee: General Electric Company, Schenectady, NY (US)

( * ) Notice: Subject to any disclaimer, the term of this patent is extended or adjusted under 35 U.S.C. 154(b) by 915 days.

(21) Appl. No.: 12/143,582

(22) Filed: Jun. 20, 2008

(65) Prior Publication Data

US 2009/0316964 A1 Dec. 24, 2009

(51) Int. Cl.
*G06K 9/00* (2006.01)
(52) U.S. Cl. ....................................... 382/128
(58) Field of Classification Search .................. 382/128
See application file for complete search history.

(56) References Cited

U.S. PATENT DOCUMENTS

| | | | | |
|---|---|---|---|---|
| 4,729,019 | A * | 3/1988 | Rouvrais | 382/128 |
| 6,563,941 | B1 * | 5/2003 | O'Donnell et al. | 382/131 |
| 7,333,643 | B2 * | 2/2008 | Murphy et al. | 382/128 |
| 7,702,141 | B2 * | 4/2010 | Sirohey et al. | 382/131 |
| 2004/0114727 | A1 * | 6/2004 | Yan et al. | 378/210 |
| 2006/0239553 | A1 | 10/2006 | Florin et al. | |
| 2009/0297008 | A1 * | 12/2009 | Taxt et al. | 382/131 |
| 2010/0240996 | A1 * | 9/2010 | Ionasec et al. | 382/128 |

OTHER PUBLICATIONS

Pham et al., Current Methods in Medical Image Segmentation, Annual Rev. Biomed Eng., 2000, pp. 315-337.*
Boykov, Yuri and Vladimir Kolmogorov, "An Experimental Comparison of Min-Cut/Max-Flow Algorithms for Energy Minimization in Vision," IEEE Transactions on PAMI, vol. 26, No. 9, pp. 1124-1137, Sep. 2004.
Boykov, Yuri, Olga Veksler, and Ramin Zabih, "Fast Approximate Energy Minimization via Graph Cuts," IEEE Transaction on Pattern Analysis and Machine Intelligence (PAMI) 23, pp. 1222-1239, Nov. 2001.
Chang, Chih-Chung and Chih-Jen Lin, "LIBSVM—A Library for Support Vector Machines," software available at http://www.csie.ntu.edu.tw/cjlin/libsvm, 2001.
Felzenszwalb, Pedro F. and Daniel P. Huttenlocher, "Efficient Graph-Based Image Segmentation," International Journal on Computer Vision 59(2), pp. 167-181, 2004.
Liu, Xiaoquing, Jagath Samarabandu, Shuo Li, Ian Ross and Greg Garvin, "A Learning-based Automatic Clinical Organ Segmentation in Medical Images," Medical Imaging 2007: Image Processing, Proc. of SPIE vol. 6512, 65120Y (2007).
Platt, John C., "Probabilistic Outputs for Support Vector Machines and Comparisons to Regularized Likelihood Methods," Advances in Large Margin Classifiers, MIT Press (1999).

* cited by examiner

*Primary Examiner* — Christopher Mahoney
(74) *Attorney, Agent, or Firm* — McAndrews, Held & Malloy, Ltd.; Armando Pastrana, Jr.

(57) ABSTRACT

Certain embodiments of the present technology provide systems, methods and computer instructions for computer aided analysis of images. In certain embodiments, for example, such a method includes: isolating a motion area in an image; segmenting the image; utilizing a support vector machine to identify a region of interest in the image; utilizing a graph-cut algorithm to refine the region of interest; and verifying the region of interest. In certain embodiments, for example, such a method further includes: aligning a set of images and/or outputting a set of aligned images sequentially. In certain embodiments, the systems, methods and computer instructions disclosed herein can be used to aid analysis of cardiac images, for example. In certain embodiments, the systems, methods and computer instructions disclosed herein can be used to aid analysis of four dimensional images, for example.

34 Claims, 4 Drawing Sheets

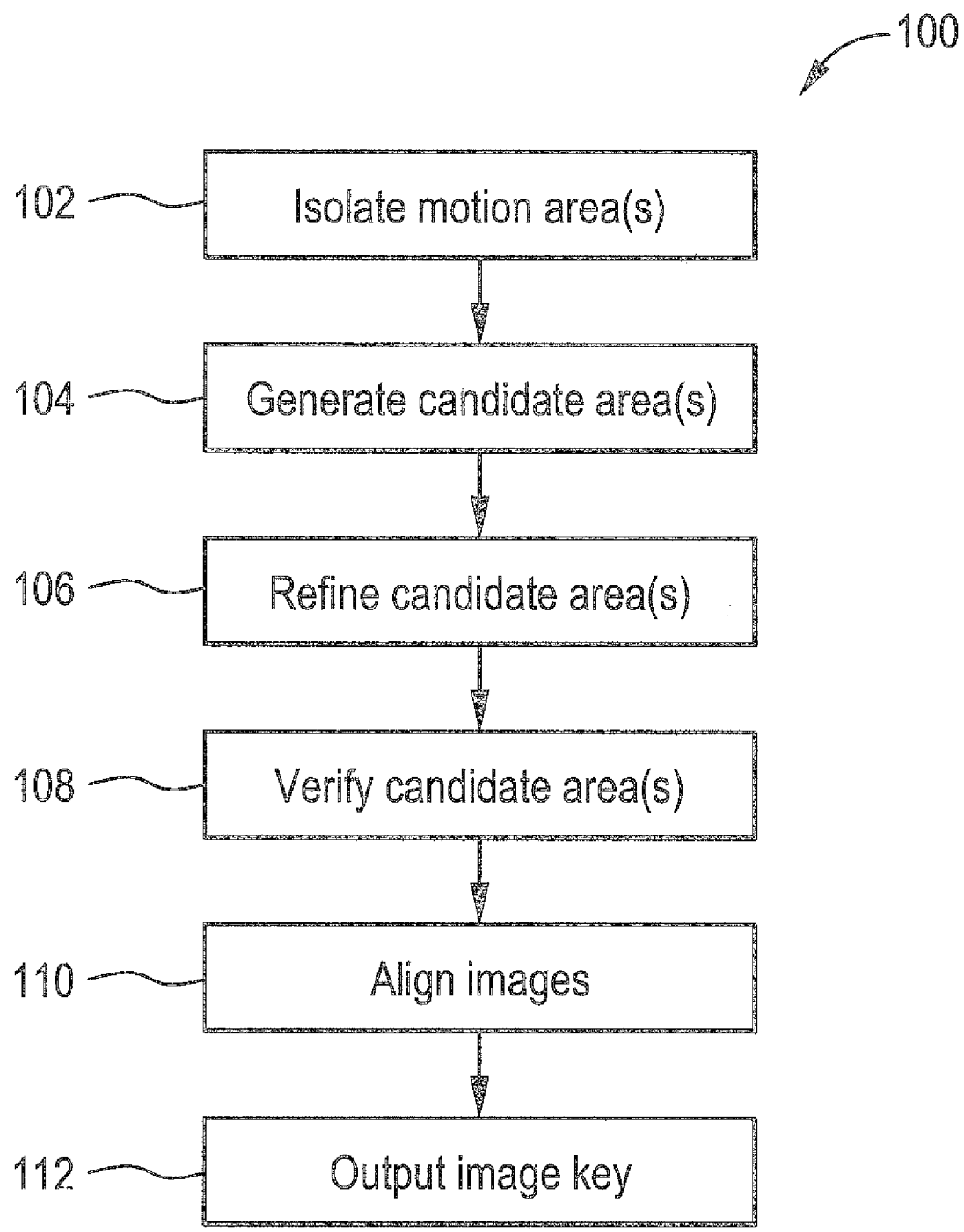

SYSTEM AND METHODS FOR COMPUTER AIDED ANALYSIS OF IMAGES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Healthcare environments, such as hospitals or clinics, include information systems, such as hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR). Information stored may include patient medical histories, imaging data, test results, diagnosis information, management information, and/or scheduling information, for example. The information may be centrally stored or divided at a plurality of locations. Healthcare practitioners may desire to access patient information or other information at various points in a healthcare workflow. For example, during and/or after surgery, medical personnel may access patient information, such as images of a patient's anatomy, that are stored in a medical information system. Radiologists, cardiologists and/or other clinicians may review stored images and/or other information, for example.

Using a PACS and/or other workstation, a clinician, such as a radiologist or cardiologist, for example, may perform a variety of activities, such as an image reading, to facilitate a clinical workflow. A reading, such as a radiology or cardiology procedure reading, is a process of a healthcare practitioner, such as a radiologist or a cardiologist, viewing digital images of a patient. The practitioner performs a diagnosis based on a content of the diagnostic images and reports on results electronically (e.g., using dictation or otherwise) or on paper. The practitioner, such as a radiologist or cardiologist, typically uses other tools to perform diagnosis. Some examples of other tools are prior and related prior (historical) exams and their results, laboratory exams (such as blood work), allergies, pathology results, medication, alerts, document images, and other tools. For example, a radiologist or cardiologist typically looks into other systems such as laboratory information, electronic medical records, and healthcare information when reading examination results.

Cardiovascular disease is a leading cause of death in the western world, which can contribute to increasing personal, community and health care costs. Modern imaging techniques, such as Magnetic Resonance Imaging (MRI) and Commuted Tomography (CT), for example, have been recognized as enabling assessment of the presence and extent of cardiovascular disease. However, the amount of image data involved in a comprehensive patient study can be massive. For example, gated cardiac MRI or CT sequences recorded from a complete cardiac cycle can include 1500-5000 two dimensional (2D) images, which can pose challenges to archiving, storage and data transfer.

Four-dimensional (4D) imaging and five-dimensional (5D) imaging, which is 4D data acquired at different time points, such as 4D and 5D MRI, for example, can play an important role in understanding the mechanisms involved in the progression of cardiovascular disease. However, 4D and 5D imaging pose challenges to human perception, which is more accustomed to 2D images. Moreover, manual analysis of 4D and/or 5D images can be subjective and can compromise the accuracy and reproducibility of quantitative measurements. Some known methods for analyzing 4D and/or 5D images require human interactions, and others are not suitable for use in a clinical environment due to other limitations.

Also, alignment and navigation of inter-modality and/or intra-modality images can be challenging because images are captured in various orientations and positions and at different scales. Even for an expert, it can be a time consuming process to manually align data. Further, different gating methods currently used in the clinical environment, coupled with noise and error, can make it difficult to manually align data. For example, peripheral-gated images can be delayed with respect to precordial-gated images. Also, gating information is not always provided when images are made available for inspection, for example, on a PACS. Also, different temporal resolutions (number of frames) can be used for different modalities and different diseases, making image alignment and navigation difficult.

BRIEF SUMMARY OF THE INVENTION

Certain embodiments of the present technology provide systems, methods and computer instructions for computer aided analysis of images.

In certain embodiments, for example, a method for computer aided analysis of images includes: isolating a motion area in an image; segmenting the image; utilizing a support vector machine to identify a region of interest in the image; utilizing a graph-cut algorithm to refine the region of interest; and verifying the region of interest.

In certain embodiments, for example, a system for computer aided analysis of images includes: a processor; and a memory in communication with the processor, the memory including program code executable by the processor to perform the following: isolating a motion area in an image; segmenting the image; utilizing a support vector machine to identify a region of interest in the image; utilizing a graph-cut algorithm to refine the region of interest; and verifying the region of interest.

In certain embodiments, for example, a computer-readable storage medium including a set of instructions for execution on a processing device and associated processing logic for computer aided analysis of images includes: a routine configured to isolate a motion area in an image; a routine configured to segment the image; a routine configured to utilize a support vector machine to identify a region of interest in the image; a routine configured to utilize a graph-cut algorithm to refine the region of interest; and a routine configured to verify the region of interest.

BRIEF DESCRIPTION OF SEVERAL VIEWS OF THE DRAWINGS

FIG. 1 is a flow diagram that illustrates a method used in accordance with an embodiment of the present technology.

Figure 2A:
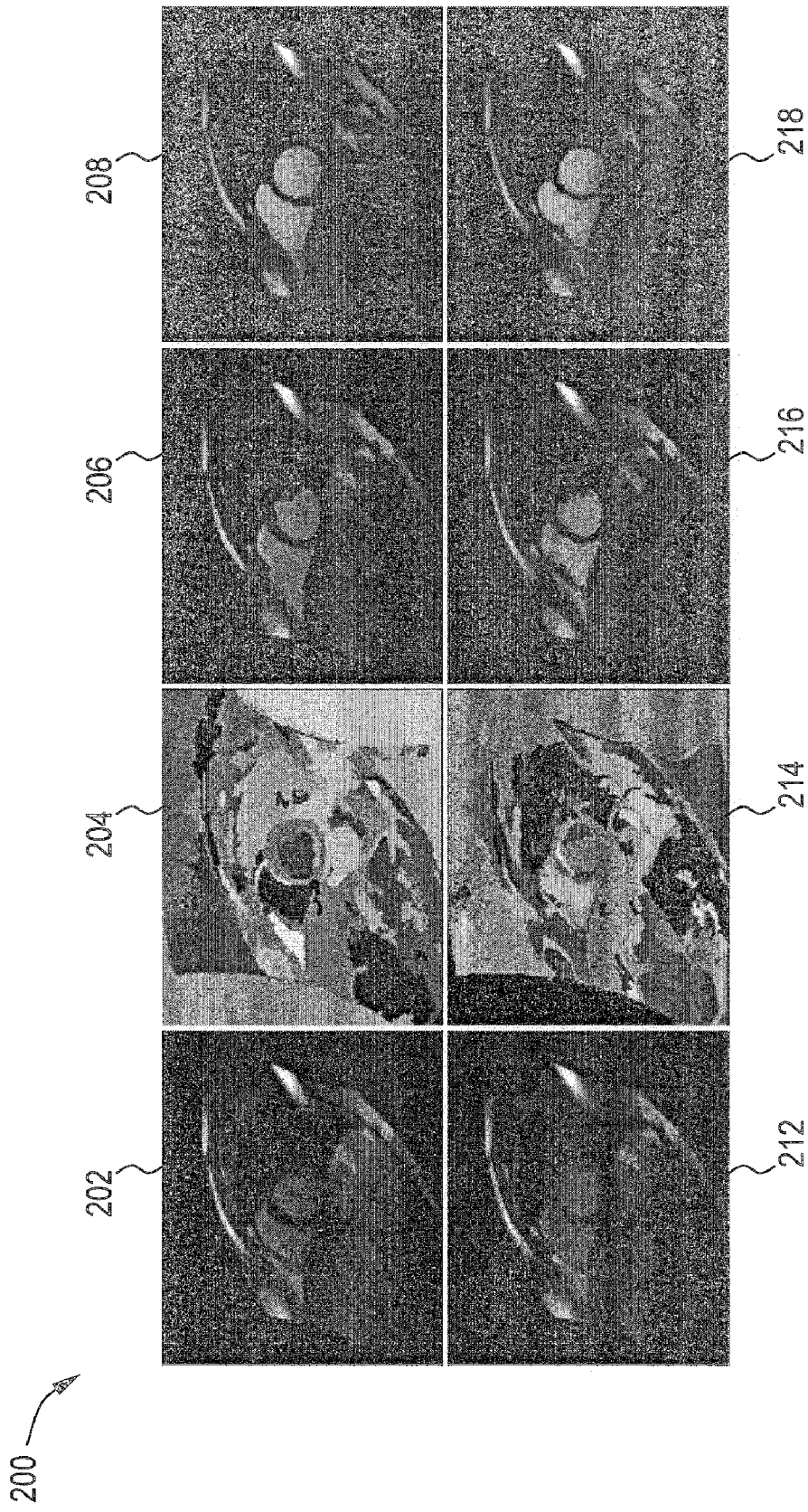
FIG. 2A depicts experimental results from a system and method used in accordance with an embodiment of the present technology.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain embodiments of the present technology provide systems, methods and computer instructions for computer aided analysis of images.

FIG. 1 is a flow diagram that illustrates a method 100 used in accordance with an embodiment of the present technology. In connection with the method 100, analysis of the heart is discussed as an example. In certain embodiments, for example, other organs and/or structures can be analyzed applying the method 100. In certain embodiments, for example, the method 100 can be used to automatically segment an image, such as an image of the heart, for example. In certain embodiments, for example, the method 100 can be used to automatically align and/or navigate a set of images, such as images of the heart, for example.

At 102, an area(s) of motion is isolated. In order to isolate a motion area(s), a Fourier transform (FT) in the temporal domain with a priori information in space can be applied. For example, in certain embodiments, an area(s) of motion of the heart can be isolated. In such embodiments, for example, the size and location of the motion areas of the heart, as well as the frequency given by the heart rate, can make the motion areas of the heart distinguishable by detecting the change in the intensity values over time at each pixel position in a set of 4D and/or 5D images. As such, the FT can be used to detect frequency motion and/or motion of any kind. Also, a temporal edge detector (rather than or in connection with the FT) can be used to detect frequency motion and/or motion of any kind. For example, in certain embodiments, the heart can be isolated by organizing image frames slice by slice and applying a temporal edge detector over time to obtain the dynamic part for each slice. The temporal edge detection on each slice can be summed together to form a dynamic confidence map (DCM). The vertical and horizontal profile mappings of the DCM can be computed. The region of motion based on the vertical and horizontal profile and the shape prior can be isolated. This information can be used to compute the area of motion for each slice. Also, the centroid of each area of motion can be defined based on the common areas and their surrounding within the region of motion.

At 104, a candidate area(s) is generated using a novel image segmentation technique. First, an image can be segmented using known techniques, for example, as described in *Efficient Graph-Based Image Segmentation*, by Pedro F. Felzenszwalb and Daniel P. Huttenlocher, International Journal on Computer Vision 59(2), pp. 167-181, 2004, which is incorporated herein by reference in its entirety. However, such techniques can over segment an image when considered in connection with the present method. See, for example, FIG. 2A, which illustrates an original image at 202 and an over segmented version of the image at 204. Also see, for example, FIG. 2A, which illustrates an original image at 212 and an over segmented version of the image at 214. Thus, the method 100 further employs a support vector machine (SVM) to narrow the candidate(s). See, for example, *Probabilistic Outputs for Support Vector Machines and Comparisons to Regularized Likelihood Methods*, by John C. Platt, Mar. 26, 1999, which is incorporated herein by reference in its entirety. For example, certain embodiments of the present technology can utilize support vector machine software such as *LIBSVM—A Library for Support Vector Machines*, by Chih-Chung Chang and Chih-Jen Lin, for example, which is available at http://www.csie.ntu.edu.tw/~cjlin/libsvm/, and is incorporated herein by reference in its entirety.

In certain embodiments, for example, the SVM can be trained to utilize features in five categories (i.e., location of a region, geometry of the region, intensity of the region, edges of the region, and texture of the region) that can be computed on the over segmented image areas and can be used to choose a candidate area(s). In certain embodiments, for example, region location features can include two centroid features that can be used to determine if the region is central to the image, and four features for considering the percentage of the region in a given area of the image. In certain embodiments, for example, region geometry features can include orientation, shape (e.g., major axis/minor axis), eccentricity and/or area. In certain embodiments, for example, edge features can include four mean compass filters. In certain embodiments, for example, color features can include a mean intensity value. In certain embodiments, for example, texture features can include fifteen DOOG filters, twelve for considering a mean abs response, one for considering a mean of variables in T1, one for considering an id of max of variables in T1, and one for considering max-median of variables in T1.

Based on the over segmented images and the selection criteria, the SVM can output a binary output, for example, that indicates a region of interest (ROI) or a non-ROI. An area identified as a ROI can be a candidate area. An area identified as a non-ROI is not a candidate area. See, for example, FIG. 2A, wherein the over segmented version of an image is shown at 204 and the image with candidate areas identified by the SVM is shown at 206. Also see, for example, FIG. 2A, wherein the over segmented version of an image is shown at 214 and the image with candidate areas identified by the SVM is shown at 216.

At 106 a candidate area(s) of 104 can be refined. For example, volumetric data associated with the candidate area(s) can be processed to present an image that can be more useful to a viewer. Graph-cut algorithms that minimize an energy function are known to be useful in this endeavor. See, for example, *An Experimental Comparison of Min-Cut/Max-Flow Algorithms for Energy Minimization in Vision*, by Yuri Boykov and Vladimir Kolmogorov, IEEE Transactions on Pattern Analysis and Machine Intelligence (PAMI), Vol. 26, No. 9, pp. 1124-1137, September 2004, which is incorporated herein by reference in its entirety, and *Fast Approximate Energy Minimization via Graph Cuts*, by Yuri Boykov, Olga Veksler and Ramin Zabih, IEEE Transactions on Pattern Analysis and Machine Intelligence (PAMI), Vol. 23, No. 11, pp. 1222-1239, November 2001, which is incorporated herein by reference in its entirety.

In certain embodiments, for example a graph-cut algorithm can be utilized to minimize a label-based energy function defined as:

$$E(L) = \lambda \sum_{p \in P} D_p(L_p) + (1-\lambda) \sum_{(p,q) \in N} V_{pq}(L_p, L_q),$$

where $D_p(L_p)$ is a data term and $V_{pq}(L_p, L_q)$ is a smoothness term. The data term specifies the penalty of pixel p being label $L_P$, and the smoothness term specifies the penalty for neighbor pixels p and q, which are labeled as $L_P$ and $L_q$.

In connection with the method 100, for example, the data term and smoothness term can be defined as:

$$D_p(L_p) = |I_{svm}(p) - \alpha \cdot L_p|$$

$$V_{pq}(L_p, L_q) = \begin{cases} 0 \\ b \cdot \exp\left(-\frac{(I_p - I_q)^2}{2\sigma^2}\right) \end{cases}$$

if $L_P = L_q$
Otherwise where $I_{svm}(p)$ is the intensity of pixel p in the SVM classified image, and where a and b are coefficients.

At 108, a refined candidate area(s) can be verified. That is, non-motion areas can be removed and/or domain knowledge constraints can be used to remove false positive regions. For example, in certain embodiments, domain knowledge constraints can include size, shape and/or location information. In certain embodiments, for example, the following equations can be used to remove regions from a heart image that are too small to be a ventricle:

$$D_i \geq T_1(l^i_{major} + l^j_{major})$$
$$D_i = \min_{i \neq m} D(i,m), (i, m = 1 \ldots n),$$
$$j = \arg\min_m D(i,m)$$

where $T_1$ is the threshold obtained from prior knowledge/studies, $l^i_{major}$ is the major axis length of the ith region, $l^j_{major}$ is the major axis length of the jth region, and $D(i,m)$ is the Euclidian centroid distance between the ith and mth regions. In such embodiments, for example, if $D_i \geq T_1(l^i_{major} + l^j_{major})$ is not satisfied, that region can be removed as being a false positive. In certain embodiments, for example, $T_1$ can be 1.25.

In certain embodiments, for example, the following equation can be used to remove regions from a heart image that include elongated shapes that are too long and narrow to be a ventricle:

$$\text{Elongation} = \frac{l_{major}}{l_{minor}} \geq T_2,$$

where $T_2$ is the threshold obtained from prior knowledge/studies, $l_{major}$ is the major axis length, and $l_{minor}$ is the minor axis length. In such embodiments, for example, if Elongation $\geq T_2$ is satisfied, the entire region can be removed as being a false positive. In certain embodiments, for example, $T_2$ can be 3.0.

In the method 100, for example, candidate area refinement 106 and verification 108 can provide for improved image quality. See, for example, FIG. 2A, wherein 208 is a version of the image 206 after the image has been refined and verified. Also see, for example, FIG. 2A, wherein 218 is a version of the image 216 after the image has been refined and verified.

At 110 images are aligned. For example, it may be difficult for a user of a system to know where an image in a series of images belongs. For example, in connection with the heart, a lone image may not indicate where the heart is at in the contraction/retraction cycle when the image is procured. In certain embodiments, for example, aligning 4D and/or 5D images can include computing functional matrices based on known parameters of the motion area being analyzed. For example, in connection with the heart, such matrices can provide details as to where the heart is at in the contraction/retraction cycle when the image is procured. For example, in certain embodiments, aligning heart ventricle images can include computing functional matrices that include terms for end-diastolic volume (EDV) and end-systolic volume (ESV). EDV is the amount of blood found in a ventricle at the end of diastole (i.e., the greatest amount of blood found in a ventricle during the cardiac cycle), and can be used as a measure of preload on the heart. ESV is the amount of blood in a ventricle at the end of systole (i.e., the smallest volume of blood in the ventricle during the cardiac cycle). Based on the volume of blood in a ventricle, as detected by ventricle segmentation, EDV and ESV images can be identified, as shown for example in FIG. 2B. In certain embodiments, for example, the images can be aligned such that the image at EDV is the first image in the series, as shown for example in FIG. 2B. In certain embodiments, the images can be aligned such that the image at EDV is not the first image in the series, and in such embodiments, the EDV and ESV images can be indicated. In such embodiments, a user of the system can easily identify where the heart is at in the contraction/retraction cycle when the image was procured.

In certain embodiments, for example, other diagnostic tools can also be determined. For example, in certain embodiments, stroke volume (SV), and/or ejection fraction can be determined from EDV and ESV. In such embodiments, SV=EDV−ESV, and ejection fraction=SV/EDV.

At 112 an image key is output. In certain embodiments, for example, an image key can be output to provide a visual display of the analyzed motion area as a function of time. In certain embodiments, for example, an image key aligned as described in connection with 110 can be output to provide a visual display of the analyzed motion area of a ventricle as a function of time, as shown for example, in FIG. 2B.

One or more of the steps of the method 100 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

FIG. 2A depicts experimental results from a method used in accordance with an embodiment of the present technology. As discussed above in connection with the method 100, 202 is an original image, 204 is the over segmented version of the original image 202, 206 is a version of the over segmented image 204 that shows candidate areas identified by the SVM, and 208 is a version of the image 206 after the image has been refined and verified. Similarly, 212 is an original image, 214 is the over segmented version of the original image 212, 216 is a version of the over segmented image 214 that shows candidate areas identified by the SVM, and 218 is a version of the image 216 after the image has been refined and verified.

Figure 2B:
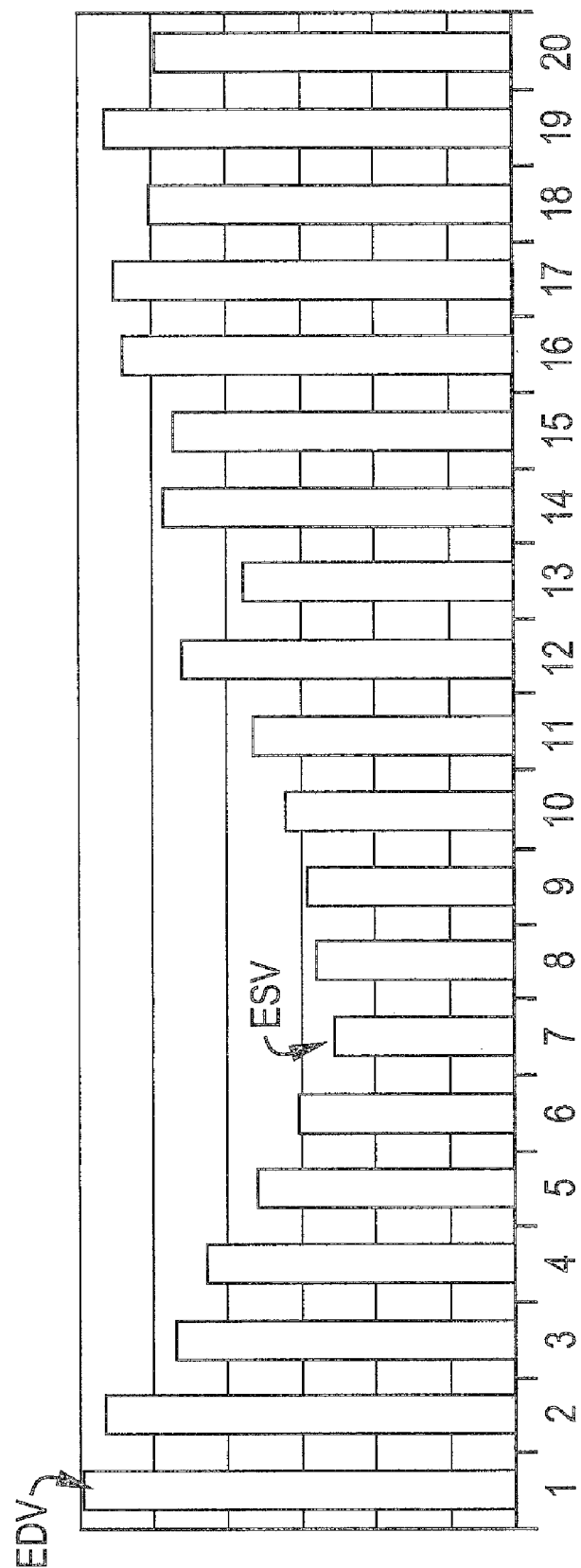
FIG. 2B is a graph that illustrates an image alignment method used in accordance with an embodiment of the present technology.

FIG. 2B is a graph that illustrates an image alignment method used in accordance with an embodiment of the present technology. As discussed above in connection with the method 100, FIG. 2B is an image key that illustrates the volume of blood in a ventricle, as detected by ventricle segmentation, as a function of time. Aligning these volume representations allows the EDV (high volume) and ESV (low volume) points to be identified. In certain embodiments, for example, the images can be aligned such that the image at EDV is the first image in the series, as shown for example in FIG. 2B. In certain embodiments, for example, the images can be aligned such that the image at EDV is not the first image in the series, and in such embodiments, the EDV and ESV images can be indicated. In such embodiments, the image key can allow a user of the system to easily identify where the heart is at in the contraction/retraction cycle when the image was procured. In certain embodiments, for example, creating and displaying such an image key can overcome gating and alignment issues associated with known methods.

Figure 3:
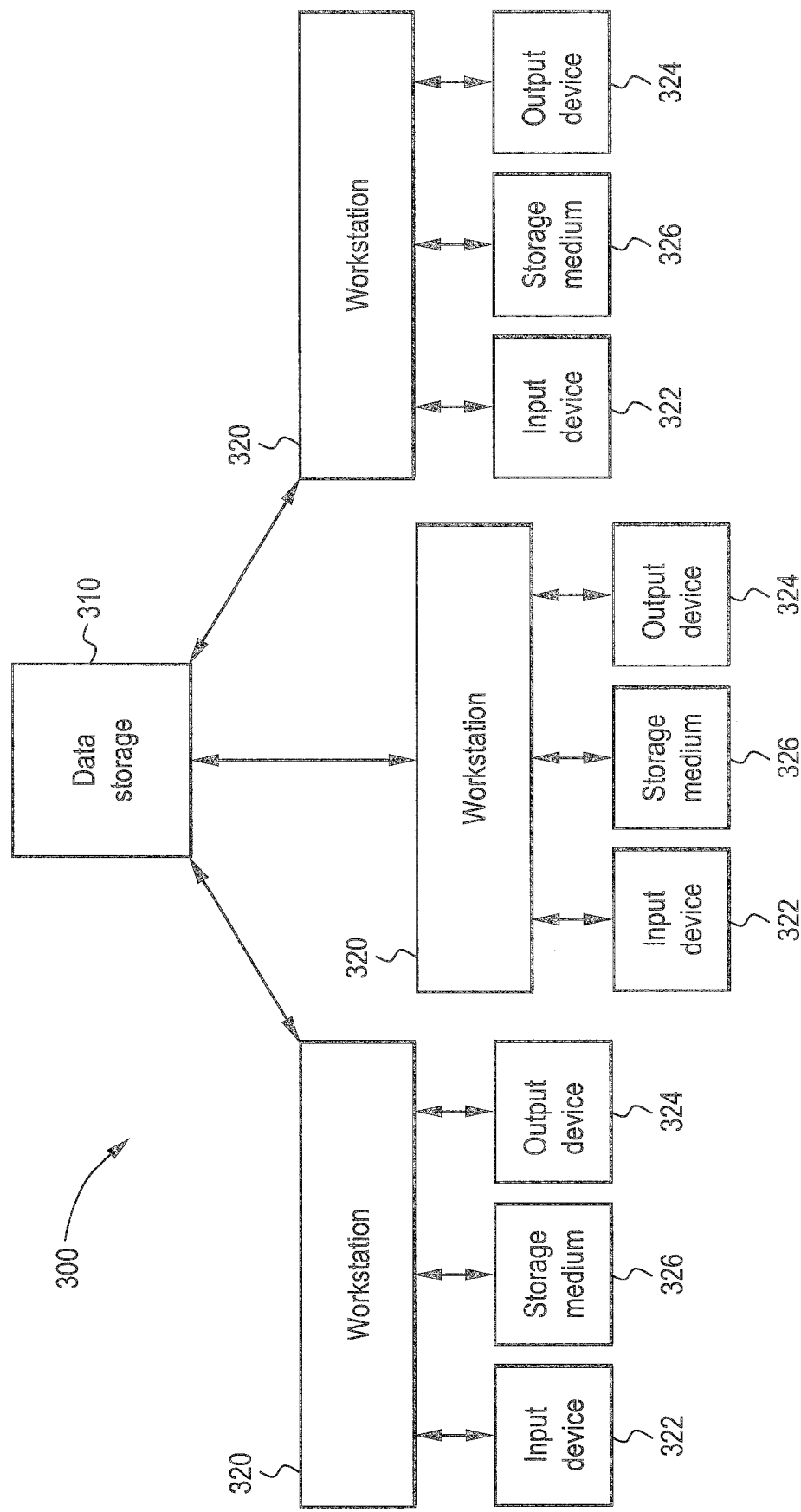
FIG. 3 illustrates a system used in accordance with an embodiment of the present technology.

Certain embodiments of the method 100 described above can be implemented on a clinical information system, such as the system 300 of FIG. 3. In certain embodiments, an interface including patient information and images may be viewed and/or constructed using a system such as system 300 including at least one data storage 310 and at least one workstation 320. While three workstations 320 are illustrated in system 300, a larger or smaller number of workstations 320 can be used in accordance with embodiments of the presently described technology. In addition, while one data storage 310 is illustrated in system 300, system 300 can include more than one data storage 310. For example, each of a plurality of entities (such as remote data storage facilities, hospitals or clinics) can each include one or more data stores 310 in communication with one or more workstations 320.

As illustrated in system 300, one or more workstations 320 can be in communication with at least one other workstation 320 and/or at least one data storage 310. Workstations 320 can be located in a single physical location or in a plurality of locations. Workstations 320 can be connected to and communicate via one or more networks.

Workstations 320 can be directly attached to one or more data stores 310 and/or communicate with data storage 310 via one or more networks. Each workstation 320 can be implemented using a specialized or general-purpose computer executing a computer program for carrying out the processes described herein. Workstations 320 can be personal computers or host attached terminals, for example. If workstations 320 are personal computers, the processing described herein can be shared by one or more data stores 310 and a workstation 320 by providing an applet to workstation 320, for example.

Workstations 320 include an input device 322, an output device 324 and a storage medium 326. For example, workstations 320 can include a mouse, stylus, microphone and/or keyboard as an input device. Workstations 320 can include a computer monitor, liquid crystal display ("LCD") screen, printer and/or speaker as an output device.

Storage medium 326 of workstations 320 is a computer-readable memory. For example, storage medium 326 can include a computer hard drive, a compact disc ("CD") drive, a USB thumb drive, or any other type of memory capable of storing one or more computer software applications. Storage medium 326 can be included in workstations 320 or physically remote from workstations 320. For example, storage medium 326 can be accessible by workstations 320 through a wired or wireless network connection.

Storage medium 326 includes a set of instructions for a computer. The set of instructions includes one or more routines capable of being run or performed by workstations 320. The set of instructions can be embodied in one or more software applications or in computer code.

Data storage 310 can be implemented using a variety of devices for storing electronic information such as a file transfer protocol ("FTP") server, for example. Data storage 310 includes electronic data. For example, data storage 310 can store patient exam images and/or other information, electronic medical records, patient orders, etc., for a plurality of patients. Data storage 310 may include and/or be in communication with one or more clinical information systems, for example.

Communication between workstations 320, workstations 320 and data storage 310, and/or a plurality of data stores 310 can be via any one or more types of known networks including a local area network ("LAN"), a wide area network ("WAN"), an intranet, or a global network (for example, Internet). Any two of workstations 320 and data stores 310 can be coupled to one another through multiple networks (for example, intranet and Internet) so that not all components of system 300 are required to be coupled to one another through the same network.

Any workstations 320 and/or data stores 310 can be connected to a network or one another in a wired or wireless fashion. In an example embodiment, workstations 320 and data store 310 communicate via the Internet and each workstation 320 executes a user interface application to directly connect to data store 310. In another embodiment, workstation 320 can execute a web browser to contact data store 310. Alternatively, workstation 320 can be implemented using a device programmed primarily for accessing data store 310.

Data storage 310 can be implemented using a server operating in response to a computer program stored in a storage medium accessible by the server. Data storage 310 can operate as a network server (often referred to as a web server) to communicate with workstations 320. Data storage 310 can handle sending and receiving information to and from workstations 320 and can perform associated tasks. Data storage 310 can also include a firewall to prevent unauthorized access and enforce any limitations on authorized access. For instance, an administrator can have access to the entire system and have authority to modify portions of system 300 and a staff member can only have access to view a subset of the data stored at data store 310. In an example embodiment, the administrator has the ability to add new users, delete users and edit user privileges. The firewall can be implemented using conventional hardware and/or software.

Data store 310 can also operate as an application server. Data store 310 can execute one or more application programs to provide access to the data repository located on data store 310. Processing can be shared by data store 310 and workstations 320 by providing an application (for example, a java applet). Alternatively, data store 310 can include a standalone software application for performing a portion of the processing described herein. It is to be understood that separate servers may be used to implement the network server functions and the application server functions. Alternatively, the network server, firewall and the application server can be implemented by a single server executing computer programs to perform the requisite functions.

The storage device located at data storage 310 can be implemented using a variety of devices for storing electronic information such as an FTP server. It is understood that the storage device can be implemented using memory contained in data store 310 or it may be a separate physical device. The storage device can include a variety of information including a data warehouse containing data such as patient medical data, for example.

Data storage 310 can also operate as a database server and coordinate access to application data including data stored on the storage device. Data storage 310 can be physically stored as a single database with access restricted based on user characteristics or it can be physically stored in a variety of databases.

In an embodiment, data storage 310 is configured to store data that is recorded with or associated with a time and/or date stamp. For example, a data entry can be stored in data storage 310 along with a time and/or date at which the data was entered or recorded initially or at data storage 310. The time/date information can be recorded along with the data as, for example, metadata. Alternatively, the time/date information can be recorded in the data in manner similar to the remainder of the data. In another alternative, the time/date information can be stored in a relational database or table and associated with the data via the database or table.

In an embodiment, data storage 310 is configured to store image and/or other medical data for a patient. The medical data can include data such as numbers and text. The medical data can also include information describing medical events. For example, the medical data/events can include a name of a medical test performed on a patient. The medical data/events can also include the result(s) of a medical test performed on a patient. For example, the actual numerical result of a medical test can be stored as a result of a medical test. In another example, the result of a medical test can include a finding or analysis by a caregiver that entered as text.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

For example, certain embodiments provide a computer-readable storage medium including a set of instructions for execution on a processing device and associated processing logic. The set of instructions includes a routine(s) configured to isolate a motion area(s) as described in connection with the method 100 described in connection with FIG. 1. The set of instructions also includes a routine(s) configured to generate a candidate area(s) as described in connection with the method 100 described in connection with FIG. 1. The set of instructions also includes a routine(s) configured to refine a candidate area(s) as described in connection with the method 100 described in connection with FIG. 1. The set of instructions also includes a routine(s) configured to verify a candidate area(s) as described in connection with the method 100 described in connection with FIG. 1. The set of instructions also includes a routine(s) configured to align images and output an image key as described in connection with the method 100 described in connection with FIG. 1.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:
1. A method for computer aided analysis of images including:
   isolating a motion area in an image;
   segmenting the image;
   utilizing a support vector machine to identify a region of interest in the image;
   utilizing a graph-cut algorithm to refine the region of interest; and
   verifying the region of interest,
   wherein verifying the region of interest includes identifying the region as not being of interest if the region does not conform with a domain constraint,
   wherein the domain constraint is $D_i \geq T_1(l^i_{major}+l^j_{major})$, where

$$D_i = \min_{i \neq m} D(i, m), (i, m = 1 \ldots n),$$

$$j = \operatorname{argmin}_m D(i, m),$$

$T_1$ is a user-defined threshold, $l^i_{major}$ is the major axis length of the ith region, $l^j_{major}$ is the major axis length of the jth region, and $D(i,m)$ is the Euclidian centroid distance between the ith and mth regions.

2. The method of claim 1, wherein isolating a motion area in the image includes detecting a change in an intensity value of a pixel position in the image over time.

3. The method of claim 2, wherein isolating a motion area includes at least one of applying a Fourier Transform and applying a temporal edge detector.

4. The method of claim 1, wherein the support vector machine is trained to identify a region of interest based on at least one of: region location, geometry of the region, intensity of the region, edges of the region, and texture of the region.

5. The method of claim 1, wherein verifying the region of interest includes identifying the region as not being of interest if the region is a non-motion area.

6. The method of claim 1, wherein the domain constraint includes at least one of size of the region, shape of the region, and location of the region.

7. The method of claim 1, wherein the domain constraint is for a heart ventricle, and wherein $T_1=1.25$.

8. The method of claim 1, wherein a second domain constraint is $$\text{Elongation} = \frac{l_{major}}{l_{minor}} \leq T_2,$$

where $T_2$ is a user-defined threshold, $l_{major}$ is the major axis length, and $l_{minor}$ is the minor axis length.

9. The method of claim 8, wherein the second domain constraint is for a heart ventricle, and wherein $T_2=3.0$.

10. The method of claim 1, further including:
    outputting an image key depicting a characteristic of the motion area as a function of time.

11. The method of claim 10, wherein the motion area is a ventricle.

12. The method of claim 11, wherein the characteristic is the volume of blood in the ventricle.

13. The method of claim 12, wherein the image key includes an indicator of a high volume of blood in the ventricle.

14. The method of claim 12, wherein the image key includes an indicator of a low volume of blood in the ventricle.

15. The method of claim 1, wherein the image is a four-dimensional image.

16. The method of claim 1, wherein the image is a heart.

17. A system for computer aided analysis of images including:
    at least one computer processor configured to isolate a motion area in an image;
    the at least one computer processor configured to segment the image;
    the at least one computer processor configured to use a support vector machine to identify a region of interest in the image;
    the at least one computer processor configured to use a graph-cut algorithm to refine the region of interest; and
    the at least one computer processor configured to verify the region of interest,
    wherein verifying the region of interest includes identifying the region as not being of interest if the region does not conform with a domain constraint,
    wherein the domain constraint is $D_i \geq T_1(l^i_{major}+l^j_{major})$, where $$D_i = \min_{i \neq m} D(i, m), (i, m = 1 \ldots n),$$

$$j = \operatorname{argmin}_m D(i, m),$$

$T_1$ is a user-defined threshold, $l^i_{major}$ is the major axis length of the ith region, $l^j_{major}$ is the major axis length of the jth region, and $D(i,m)$ is the Euclidian centroid distance between the ith and mth regions.

18. A non-transitory computer-readable storage medium including a set of instructions for execution on a processing device and associated processing logic for computer aided analysis of images, the set of instructions comprising:
    a routine configured to isolate a motion area in an image;
    a routine configured to segment the image;
    a routine configured to utilize a support vector machine to identify a region of interest in the image;
    a routine configured to utilize a graph-cut algorithm to refine the region of interest; and
    a routine configured to verify the region of interest,
    wherein the routine configured to verify the region of interest includes identifying the region as not being of interest if the region does not conform with a domain constraint,
    wherein the domain constraint is $D_i \geq T_1(l^i_{major}+l^j_{major})$, where $$D_i = \min_{i \neq m} D(i, m), (i, m = 1 \ldots n),$$

$$j = \operatorname{argmin}_m D(i, m),$$

$T_1$ is a user-defined threshold, $l^i_{major}$ is the major axis length of the ith region, $l^j_{major}$ is the major axis length of the jth region, and $D(i,m)$ is the Euclidian centroid distance between the ith and mth regions.

19. A system for computer aided analysis of images including:
- at least one computer processor configured to isolate a motion area in an image;
- the at least one computer processor configured to segment the image;
- the at least one computer processor configured to use a support vector machine to identify a region of interest in the image;
- the at least one computer processor configured to use a graph-cut algorithm to refine the region of interest; and
- the at least one computer processor configured to verify the region of interest,
- wherein verifying the region of interest includes identifying the region as not being of interest if the region does not conform with a domain constraint,
- wherein the domain constraint is $$\text{Elongation} = \frac{l_{major}}{l_{minor}} \leq T_2,$$

where $T_2$ is a user-defined threshold, $l_{major}$ is the major axis length, and $l_{minor}$ is the minor axis length.

20. A non-transitory computer-readable storage medium including a set of instructions for execution on a processing device and associated processing logic for computer aided analysis of images, the set of instructions comprising:
- a routine configured to isolate a motion area in an image;
- a routine configured to segment the image;
- a routine configured to utilize a support vector machine to identify a region of interest in the image;
- a routine configured to utilize a graph-cut algorithm to refine the region of interest; and
- a routine configured to verify the region of interest,
- wherein the routine configured to verify the region of interest includes identifying the region as not being of interest if the region does not conform with a domain constraint,
- wherein the domain constraint is $$\text{Elongation} = \frac{l_{major}}{l_{minor}} \leq T_2,$$

where $T_2$ is a user-defined threshold, $l_{major}$ is the major axis length, and $l_{minor}$ is the minor axis length.

21. A method for computer aided analysis of images including:
- isolating a motion area in an image;
- segmenting the image;
- utilizing a support vector machine to identify a region of interest in the image;
- utilizing a graph-cut algorithm to refine the region of interest; and
- verifying the region of interest,
- wherein verifying the region of interest includes identifying the region as not being of interest if the region does not conform with a domain constraint,
- wherein the domain constraint is $$\text{Elongation} = \frac{l_{major}}{l_{minor}} \leq T_2,$$

where $T_2$ is a user-defined threshold, $l_{major}$ is the major axis length, and $l_{minor}$ is the minor axis length.

22. The method of claim 21, wherein isolating a motion area in the image includes detecting a change in an intensity value of a pixel position in the image over time.

23. The method of claim 22, wherein isolating a motion area includes at least one of applying a Fourier Transform and applying a temporal edge detector.

24. The method of claim 21, wherein the support vector machine is trained to identify a region of interest based on at least one of: region location, geometry of the region, intensity of the region, edges of the region, and texture of the region.

25. The method of claim 21, wherein verifying the region of interest includes identifying the region as not being of interest if the region is a non-motion area.

26. The method of claim 21, wherein the domain constraint includes at least one of size of the region, shape of the region, and location of the region.

27. The method of claim 21, wherein the domain constraint is for a heart ventricle, and wherein $T_2=3.0$.

28. The method of claim 21, further including:
- outputting an image key depicting a characteristic of the motion area as a function of time.

29. The method of claim 28, wherein the motion area is a ventricle.

30. The method of claim 29, wherein the characteristic is the volume of blood in the ventricle.

31. The method of claim 30, wherein the image key includes an indicator of a high volume of blood in the ventricle.

32. The method of claim 30, wherein the image key includes an indicator of a low volume of blood in the ventricle.

33. The method of claim 21, wherein the image is a four-dimensional image.

34. The method of claim 21, wherein the image is a heart.

* * * * *